United States Patent [19]

Tajiri

[11] Patent Number: 5,974,014
[45] Date of Patent: Oct. 26, 1999

[54] DISC REPRODUCING APPARATUS AND METHOD

[75] Inventor: Takashi Tajiri, Saitama, Japan

[73] Assignee: Sony Corporation, Tokyo, Japan

[21] Appl. No.: 08/957,031

[22] Filed: Oct. 24, 1997

[30] Foreign Application Priority Data

Oct. 25, 1996 [JP] Japan ................................ 8-283569

[51] Int. Cl.⁶ ............................ G11B 3/90; G11B 5/09
[52] U.S. Cl. ............................................ 369/58; 369/47
[58] Field of Search .......................... 369/32, 33, 44.27, 369/47, 48, 50, 54, 58, 100

[56] References Cited

U.S. PATENT DOCUMENTS

| 4,497,049 | 1/1985 | D'Alayer De Costemore D'Arc .. 369/54 X |
| 5,381,392 | 1/1995 | Hira ...................................... 369/58 X |
| 5,587,982 | 12/1996 | Choi ........................................... 369/58 |

*Primary Examiner*—Paul W. Huber
*Attorney, Agent, or Firm*—Frommer Lawrence & Haug, LLP.; William S. Frommer

[57] ABSTRACT

A disc reproducing apparatus comprising a means for reproducing data recorded in a disc, a means for making a decision as to whether the reproduced data are proper or not, a means for detecting a face-down state of the disc in response to the result of the decision, and a means for controlling the driving of the disc in response to the result of the detection. When a disc (DVD) loaded in a normal state is rotated clockwise, the point of reproduction is gradually shifted toward the outermost of the disc. However, when a disc loaded in a face-down state is rotated, the point of reproduction is shifted toward the innermost of the disc, so that the required continuity of addresses fails to be ensured. Thus, the face-down state of the loaded disc can be detected from the result of the decision indicating non-continuity of the addresses.

12 Claims, 11 Drawing Sheets

DISC REPRODUCING APPARATUS AND METHOD

BACKGROUND OF THE INVENTION

1. Field of the Invention

The present invention relates to an apparatus and a method for reproducing a disc, and more particularly to those capable of detecting a face-down state of a disc.

2. Description of the Related Art

FIG. 11 shows a sectional structure of a CD (Compact Disc). As illustrated in this diagram, an information recording layer 2 is formed on a base 1, and a protective film 3 is formed on the information recording layer 2. The thickness of the base 1 is sufficiently greater than that of the protective film 3. And the information recorded in the layer 2 is reproduced by irradiation of a laser beam from the side of the base 1.

FIG. 12 shows a sectional structure of an exemplary DVD (Digital Versatile Disc) where merely a single information recording layer is formed. As illustrated, an information recording layer 12 is formed on a protective film 11, and another protective film 13 is formed on the information recording layer 12. The two protective films 11 and 13 are so formed as to be substantially the same in thickness. And the information can be reproduced by irradiation of a laser beam from the side of the protective film 11.

Since the protective film 3 is sufficiently thinner than the base 1 as shown in FIG. 11, if a CD is placed in a face-down state, it is impossible to read out the recorded information in the layer 2 even by irradiation of a laser beam from the side of the protective film 3.

Meanwhile, in the case of a DVD where the protective films 11 and 13 are substantially the same in thickness, when a user erroneously places a DVD as illustrated in FIG. 13 for example where the protective film 13 is turned opposite to a pickup, it is possible in principle to read out the recorded information in the layer 12 by irradiation of a laser beam from the side of the protective film 13 if no label or the like is stuck on the protective film 13. In this case, however, proper data fail to be obtained, and the user may misconceive that the DVD is a damaged one.

SUMMARY OF THE INVENTION

It is therefore an object of the present invention to prevent erroneous reproduction of a DVD loaded in a face-down state.

According to one aspect of the present invention, there is provided a disc reproducing apparatus which comprises a means for reproducing data recorded in a disc, a means for deciding whether the data reproduced by the reproducing means are proper or not, a means for detecting a face-down state of the disc in response to the result of the decision executed by the decision means, and a means for controlling the driving of the disc in response to the result of the detection executed by the detection means.

According to another aspect of the invention, there is provided a disc reproducing method which comprises a step of reproducing data recorded in a disc, a step of deciding whether the reproduced data are proper or not, and a step of controlling the driving of the disc in response to the result of such decision.

In the above disc reproducing apparatus and method, a decision is made as to whether the reproduced data are proper or not, and the driving of the disc is controlled in response to the result of the decision.

Since the disc driving is thus controlled, it becomes possible to prevent erroneous reproduction of the disc loaded in a face-down state.

DESCRIPTION OF THE PREFERRED EMBODIMENTS

Hereinafter some preferred embodiments of the present invention will be described with reference to the accompanying drawings. In order to clarify the relationship of correspondence between the means of the present invention defined in the appended claims and the following preferred embodiments, the features of the invention will be mentioned with addition of one corresponding embodiment in parentheses after each means. It is to be understood, however, that the following description is not limited merely to the means mentioned therein.

The disc reproducing apparatus defined in the appended claim 1 comprises a reproducing means (e.g., pickup 5 in FIG. 1) for reproducing data recorded in a disc; a decision means (e.g., CPU 15 to execute a process of step S21 in FIG. 3) to decide whether the data reproduced by the reproducing means are proper or not; and a control means (e.g., CPU 15 to execute a process of step S25 in FIG. 3) for controlling the driving of the disc in response to the result of the decision executed by the decision means.

The disc reproducing apparatus defined in the appended claim 4 further comprises a signal generating means (e.g., CPU 15 to execute a process of step S24 in FIG. 3) for generating a predetermined warning signal in response to the result of the decision executed by the decision means.

The disc reproducing method defined in the appended claim 8 comprises a reproducing step (e.g., step S20 in FIG. 3) to reproduce data recorded in a disc; a decision step (e.g., step S21 in FIG. 3) to decide whether the data reproduced at the reproducing step are proper or not; and a control step (e.g., step S25 in FIG. 3) to control the driving of the disc in response to the result obtained at the decision step.

Figure 1:
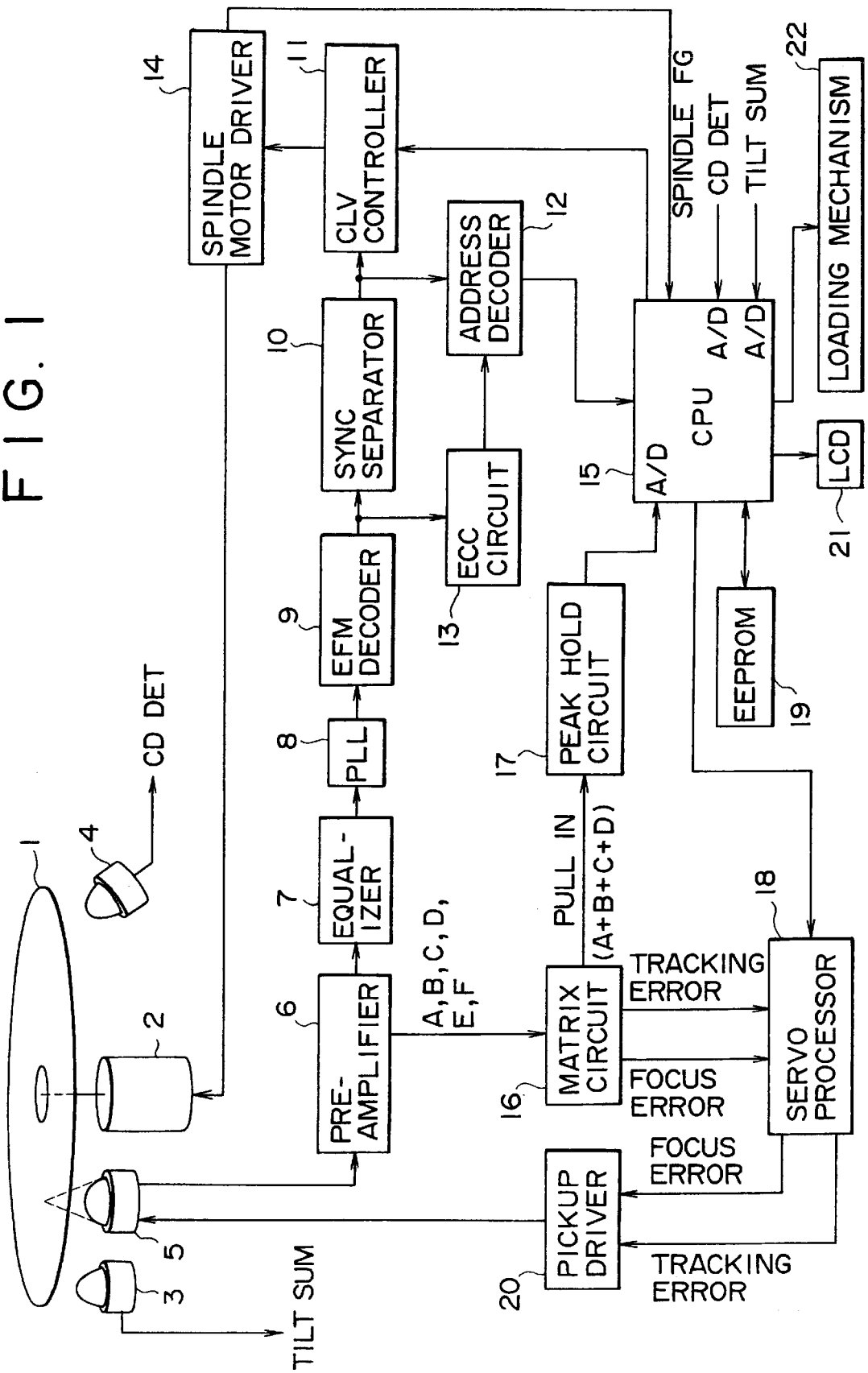
FIG. 1 is a block diagram showing an exemplary configuration of a disc reproducing apparatus of the present invention.

FIG. 1 is a block diagram showing an exemplary configuration of the disc reproducing apparatus of the present invention. A disc 1 is rotated by a spindle motor 2 at a predetermined speed. Either a CD or a DVD is loaded as such a disc 1. A tilt sensor 3 irradiates light from an internal LED to the disc 1, then receives the reflected light by an internal photo diode, subsequently detects the tilt of the disc 1, and outputs the detection result as a tilt sum to a CPU 15. A CD discrimination sensor 4 irradiates light from an internal LED to the disc 1, then makes a discrimination as to whether a track pitch on the disc 1 is 1.6 μm or not (i.e., whether the disc 1 is a CD or not), then outputs to the CPU 15 a detection signal CD Det which represents the result of such discrimination.

A pickup 5 has a laser diode and a photo diode incorporated therein, and irradiates a laser beam, which is generated from the laser diode, as reproducing light to the disc 1, and then receives, by the photo diode, the laser beam reflected from the disc 1. A preamplifier 6 amplifies a signal obtained through photo-electric conversion of the light received by the photo diode in the pickup 5, and outputs the amplified signal to an equalizer 7. Subsequently the equalizer 7 equalizes the input signal to a predetermined characteristic and outputs the equalized signal to a PLL circuit 8. The PLL circuit 8 produces a clock signal out of the input signal and then outputs the clock signal to an EFM decoder 9 together with the original signal.

The EFM decoder 9 executes EFM + (8–16 conversion) demodulation of the reproduced signal, which is obtained from the PLL circuit 8, in synchronism with the clock signal inputted from the PLL circuit 8, and then outputs the result of such demodulation to both a sync separator 10 and an ECC circuit 13. The sync separator 10 separates a sync signal from the input signal and then outputs the sync signal to both a CLV controller 11 and an address decoder 12. The ECC circuit 13 executes an error correction of the demodulated data inputted from the EFM decoder 9 and then outputs the error-corrected data to the address decoder 12. Subsequently the address decoder 12 decodes an address, out of the error-corrected data supplied from the ECC circuit 13, with reference to the sync signal supplied from the sync separator 10, and outputs the decoded address to the CPU 15.

The CLV controller 11 controls a spindle motor driver 14 under control of the CPU 15 to thereby drive a spindle motor 2. The spindle motor driver 14 generates a spindle FG signal corresponding to the rotation frequency of the spindle motor 2 and then outputs this signal to the CPU 15.

The pickup 5 serves to record or reproduce data by a three-beam method in a CD play mode, or by a single-beam method in a DVD play mode. The internal photo diode provided to receive the data recording/reproducing laser beam is divided into four of A to D. And the photo diode to receive the CD tracking laser beam is divided into E and F.

The preamplifier 6 supplies output signals of the photo diodes A–F to a matrix circuit 16 individually. The matrix circuit 16 adds the output signals of the photo diodes A–D out of the entire signals from the photo diodes A–F, and then supplies the result as a pull-in signal to a peak hold circuit 17. Then the peak hold circuit 17 holds the peak value of the input pull-in signal and outputs the peak value to the CPU 15.

The matrix circuit 16 calculates a diagonal signal ((A+C)−(B+D)) which represents the difference between the output sums of the photo diodes disposed on the diagonal line out of the four divided photo diodes A to D, thereby producing a focus error signal. When the loaded disc is a CD, the matrix circuit 16 calculates the difference (E−F) between the outputs of the photo diodes E and F, thereby producing a tracking error signal. Meanwhile, if the loaded disc is a DVD, the matrix circuit 16 produces a tracking error signal from the diagonal signal and the pull-in signal by DPD (Differential Phase Detection). A servo processor 18 receives the focus error signal and the tracking error signal from the matrix circuit 16 and, after adjusting the input signals adequately, supplies its output to a pickup driver 20. Then the pickup driver 20 drives the pickup 5 in the desired focusing or tracking direction in response to such focus error signal and the tracking error signal. The servo processor 18 further serves to drive the pickup 5 in the radial direction of the disc 1 to execute sled servo control as well.

In an EEPROM 19, there are stored a pull-in signal level PI (sldisc, slmode) for reproducing an SL (single layer) disc in an SL mode (where parameters for SL disc are set) and another pull-in signal level PI (dldisc, dlmode) for reproducing a DL (dual layer) disc in a DL mode (where parameters for DL disc are set).

On an LCD 21, a predetermined message and so forth can be displayed. A loading mechanism 22 is driven under control of the CPU 15 to load or unload the disc 1.

Now the operation of such apparatus performed at the start thereof will be described below with reference to flowcharts of FIGS. 2 and 3. First at step SI, the CPU 15 sets parameters relative to an SL disc while controlling the servo processor 18, including the power of the laser diode LD in the pickup 5 and the gain of the preamplifier 6 to amplify the output signal of the photo diode in the pickup 5. Next at step S2, the CPU 15 turns on the laser diode in the pickup 5, whereby a laser beam is emitted from the pickup 5 and is irradiated to the disc 1. Thereafter the reflected laser beam is received by the photo diode in the pickup 5, and a signal corresponding to the reflected beam is outputted to the preamplifier 6.

At step S3, the CPU 15 turns on the tilt sensor 3. Then the tilt sensor 3 emits light from the internal LED to the disc 1 and receives the reflected light therefrom to thereby detect the tilt of the disc 1. The signal thus detected is outputted as a tilt sum signal to the CPU 15. Subsequently the CPU 15 controls an unshown tilt mechanism in response to the tilt sum signal, thereby adjusting the tilt of the disc 1.

Next at step S4, the CPU 15 controls the spindle motor driver 14 via the CLV controller 11, thereby rotating the spindle motor 2 with a constant torque. Then the operation proceeds to step S5, where the CPU 15 executes a process of disc size discrimination.

Figure 4:
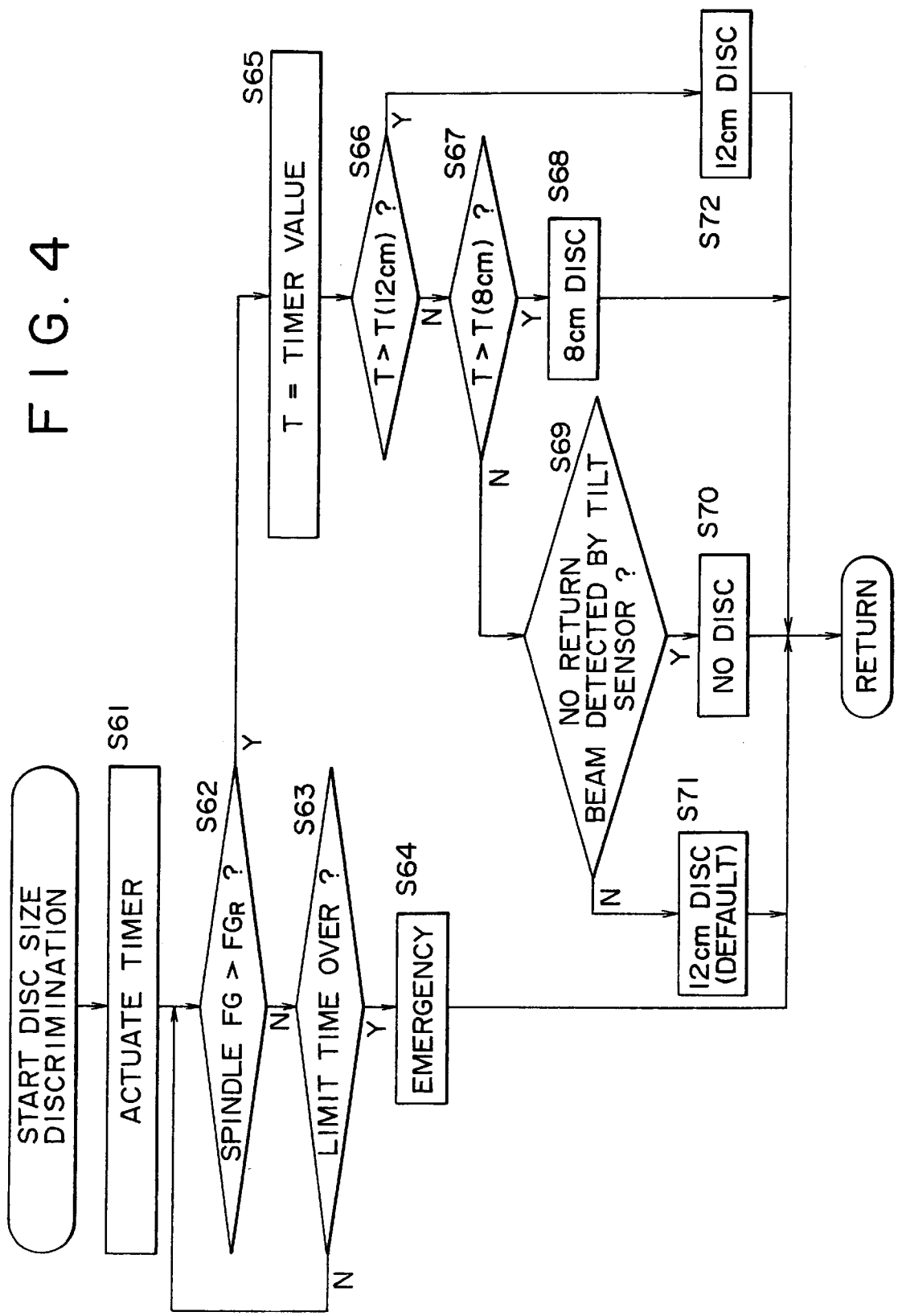
FIG. 4 is a flowchart showing details of a disc size discrimination process executed at step S5 in FIG. 2.

The detail of such disc size discrimination is shown in a flowchart of FIG. 4.

First at step S61, the CPU 15 actuates an internal timer incorporated therein. Then at step S62, the spindle motor driver 14 outputs a spindle FG in synchronism with the rotation of the disc 1 (spindle motor 2). And the CPU 15 makes a decision as to whether the spindle FG exceeds a preset target rotation speed $FG_R$ or not.

Figure 5:
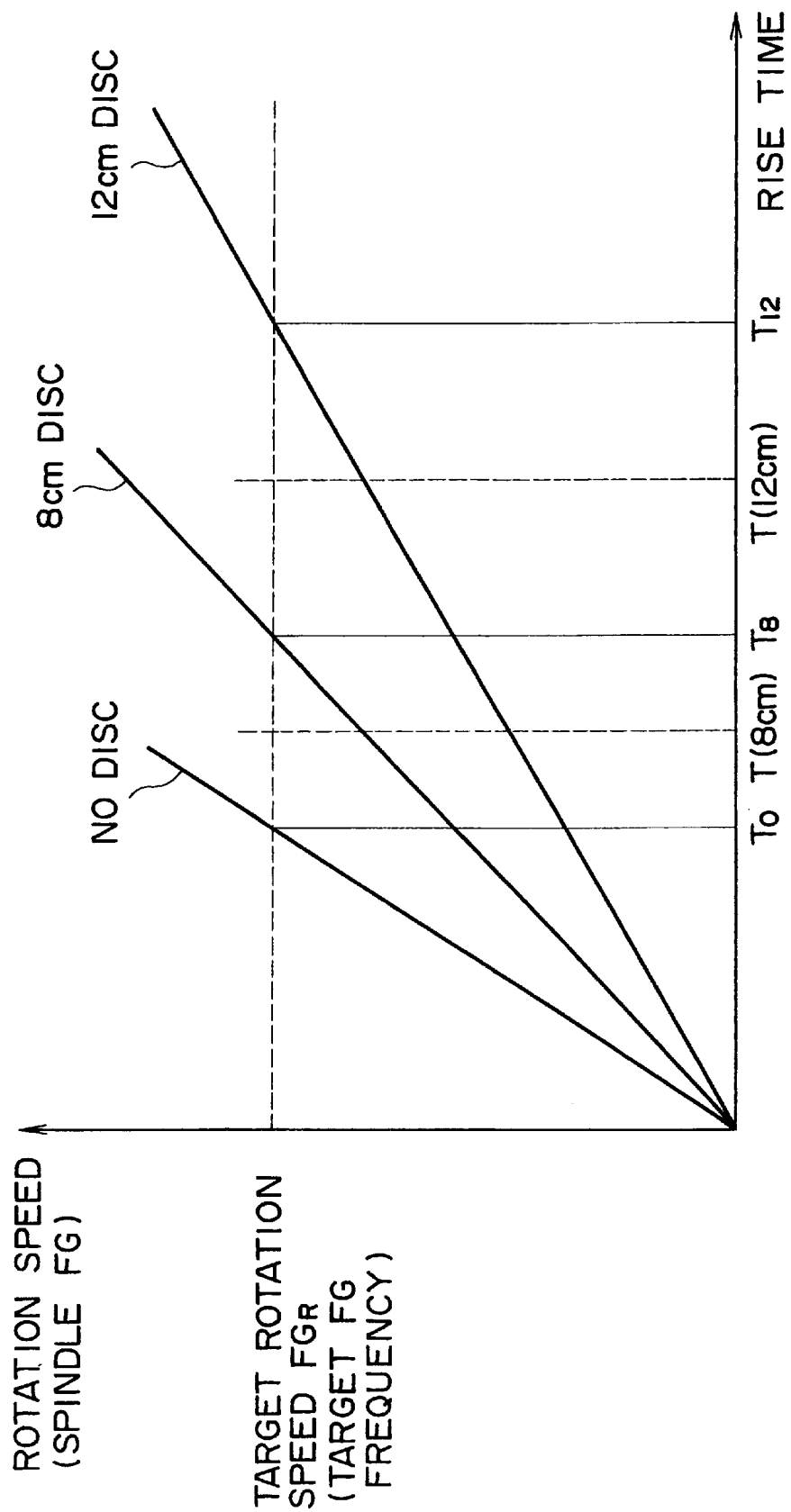
FIG. 5 graphically explains the principle of disc size discrimination.

More specifically, upon start of rotation of the spindle motor 2 at step S4, its rotation speed increases linearly as shown in FIG. 5 and, after a lapse of a predetermined time from the start, the rotation speed reaches the target speed (target FG frequency) $FG_R$.

If the result of the decision at step S62 signifies that the spindle FG is lower than the target rotation speed FGR, the operation proceeds to step S63, where another decision is made as to whether the timer actuated at step S61 has clocked a predetermined time or not. And when the result of this decision signifies no lapse of the predetermined time, the operation returns to step S62 and then a decision is made again as to whether the spindle FG exceeds the target rotation speed $FG_R$ or not.

The above process is executed repeatedly until the result of the decision signifies that the spindle FG has exceeded the target rotation speed $FG_R$. And when the result becomes affirmative, the operation proceeds to step S65 where the value of the timer at that time is set in a register T.

The disc 1 driven by the spindle motor 2 has a diameter of 8 cm or 12 cm if it is either a CD or a DVD. In comparison with an 8-cm disc, a 12-cm disc imposes a greater load on the spindle motor 2. Therefore, the time required for the spindle motor 2 to reach the target rotation speed $FG_R$ is changed as shown in FIG. 5, where the time $T_{12}$ required in the case of a 12-cm disc is longer than the time $T_8$ in the case of an 8-cm disc. When the disc 1 is not existent, the load imposed on the spindle motor 2 is further smaller, so that the time To required in this case until reaching the target rotation speed FGR is rendered further shorter than the time $T_8$.

Therefore, at step S66, the CPU 15 makes a decision as to whether or not the time T held at step S65 is longer than a preset reference value T(12 cm) which is intermediate between the time $T_8$ and the time $T_{12}$. And if the result of this decision signifies that the time T is longer than the reference value T(12 cm), the operation proceeds to step S72 where the CPU 15 decides that the loaded disc is a 12-cm one.

Meanwhile, in case the result of the decision at step S66 signifies that the time T is not longer than the reference value T(12 cm), the operation proceeds to step S67 where a decision is made as to whether the time T is longer than another reference value T(8 cm) or not. This reference value T(8 cm) is preset to be intermediate between the time $T_0$ and the time $T_8$. Accordingly, if the result of the above decision signifies that the time T is longer than the reference value T(8 cm), the loaded disc is decided to be an 8-cm one at step S68.

When the result of the decision at step S67 signifies that the time T is not longer than the reference value T(8 cm), the operation proceeds to step S69 where a decision is made as to whether the tilt sensor 3 has detected the reflected beam from the disc 1. And if the level of the reflected beam received by the tilt sensor 3 is lower than a predetermined reference value, it is considered that no disc is present. In this case, the operation of the CPU 15 proceeds to step S70 to decide that no disc is loaded on the spindle motor 2.

Meanwhile, when the result of the decision at step S69 signifies that the level of the reflected beam received by the tilt sensor 3 is higher than the reference value, it is considered that a disc is loaded on the spindle motor 2. However, the disc is neither a 12-cm one nor an 8-cm one as obvious from the decisions at steps S66 and s67. Although no other disc than such two types is existent theoretically, the operation proceeds to step S71 on the assumption that the disc size discrimination is erroneous, and it is decided temporarily here that a 12-cm disc is loaded on the spindle motor 2.

If the result of the decision at step S63 signifies that a predetermined time has elapsed prior to arrival of the spindle FG at the target rotation speed $FG_R$, the operation proceeds to step S64 where the CPU 15 regards it as occurrence of some abnormality and then executes a process of emergency.

The disc size (dimension) is thus discriminated at steps S66 and S67, and in case the results signify neither of the two disc sizes, the operation proceeds to step S69 to discriminate between the presence and the absence of any disc on the basis of the detection signal obtained from the tilt sensor 3. Therefore, in comparison with the known case of deciding the disc size merely from the output of the tilt sensor 3, an exact discrimination between the presence and the absence of any disc can be executed with more certainty. Consequently, it becomes possible to achieve faster detection of a no-disc state (within one second) as compared with the known method which is carried out generally in a CD player or an LD player by deciding the absence of the disc if a focus servo fails to be locked despite execution of a focus servo action three times (i.e., this method requires a time period of three seconds or so to detect the absence of any disc).

The decision at step S69 may be executed by means of the CD discrimination sensor 4 instead of the tilt sensor 3, or by measuring the reflectivity of the disc.

Figure 2:
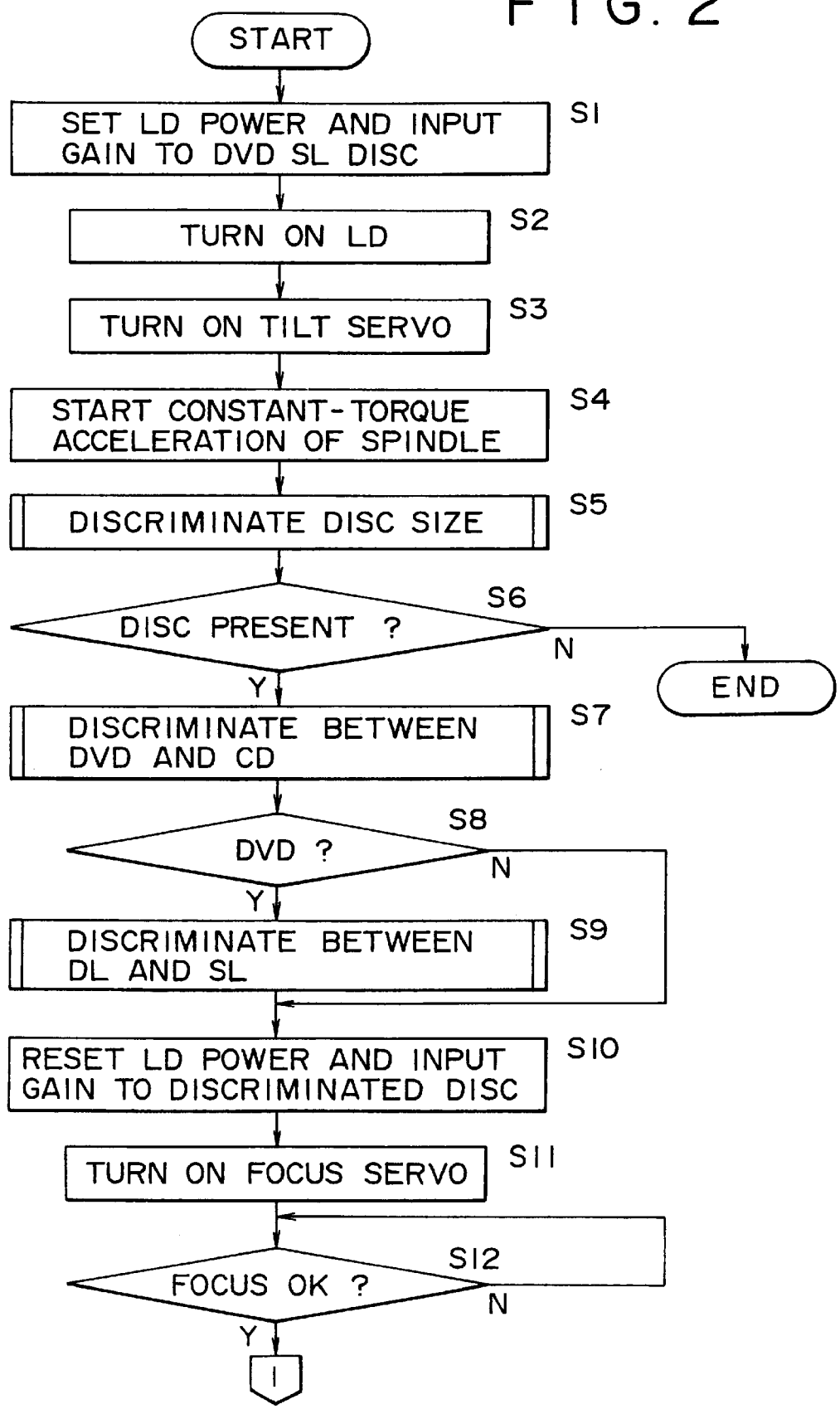
FIG. 2 is a flowchart for explaining an operation performed at the start of the disc reproducing apparatus in FIG. 1.
Figure 3:
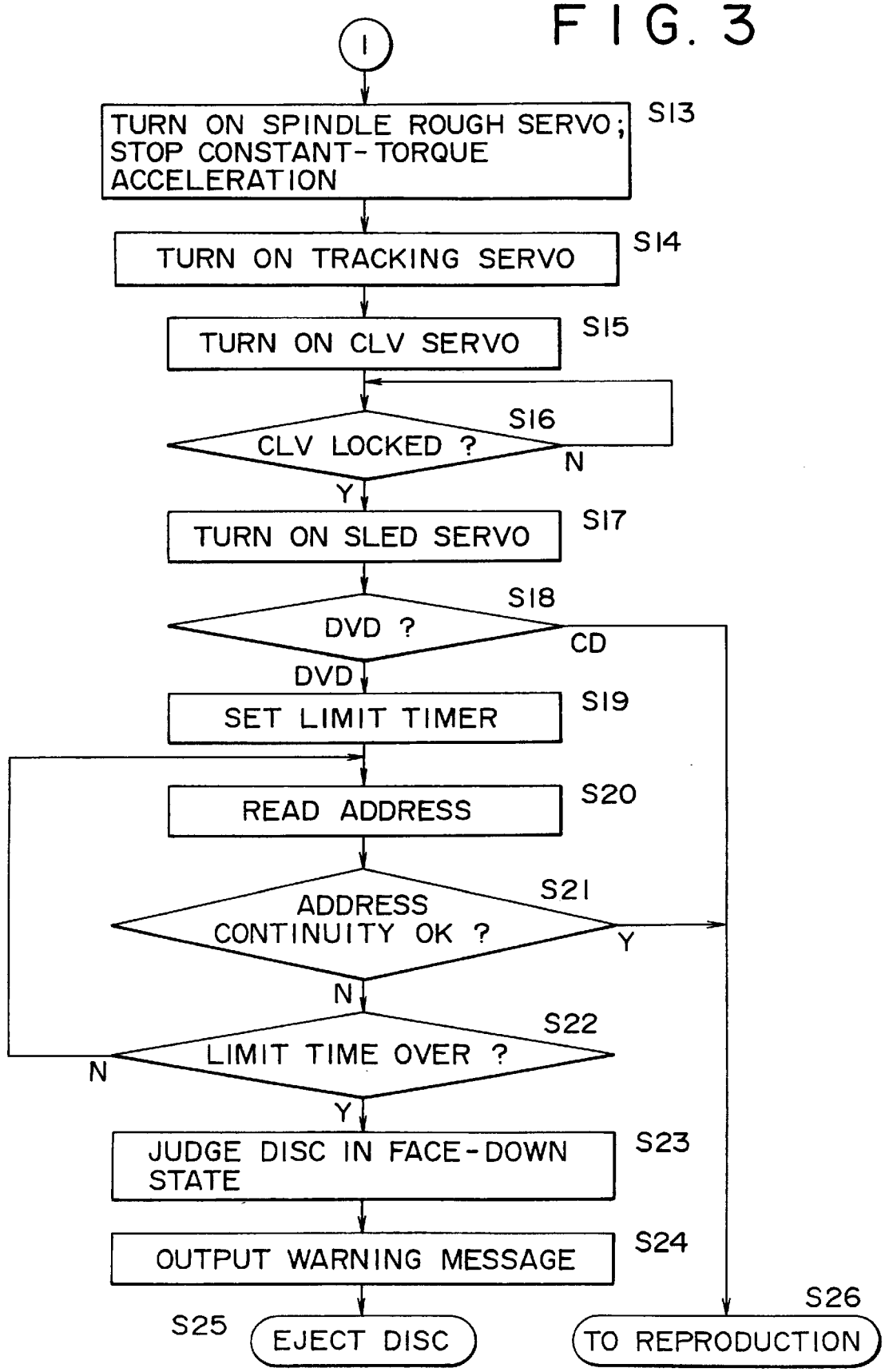
FIG. 3 is a flowchart continued from FIG. 2.

In the disc size discrimination performed as mentioned above, the CPU 15 makes a decision at step S6 in FIG. 2 as to whether any disc is present or absent. If the result of the disc size discrimination at step S5 signifies that no disc is loaded, the start process is terminated. Meanwhile, if the result signifies that some disc is loaded, the operation proceeds to step S7 to execute a process of DVD/CD discrimination.

Figure 6:
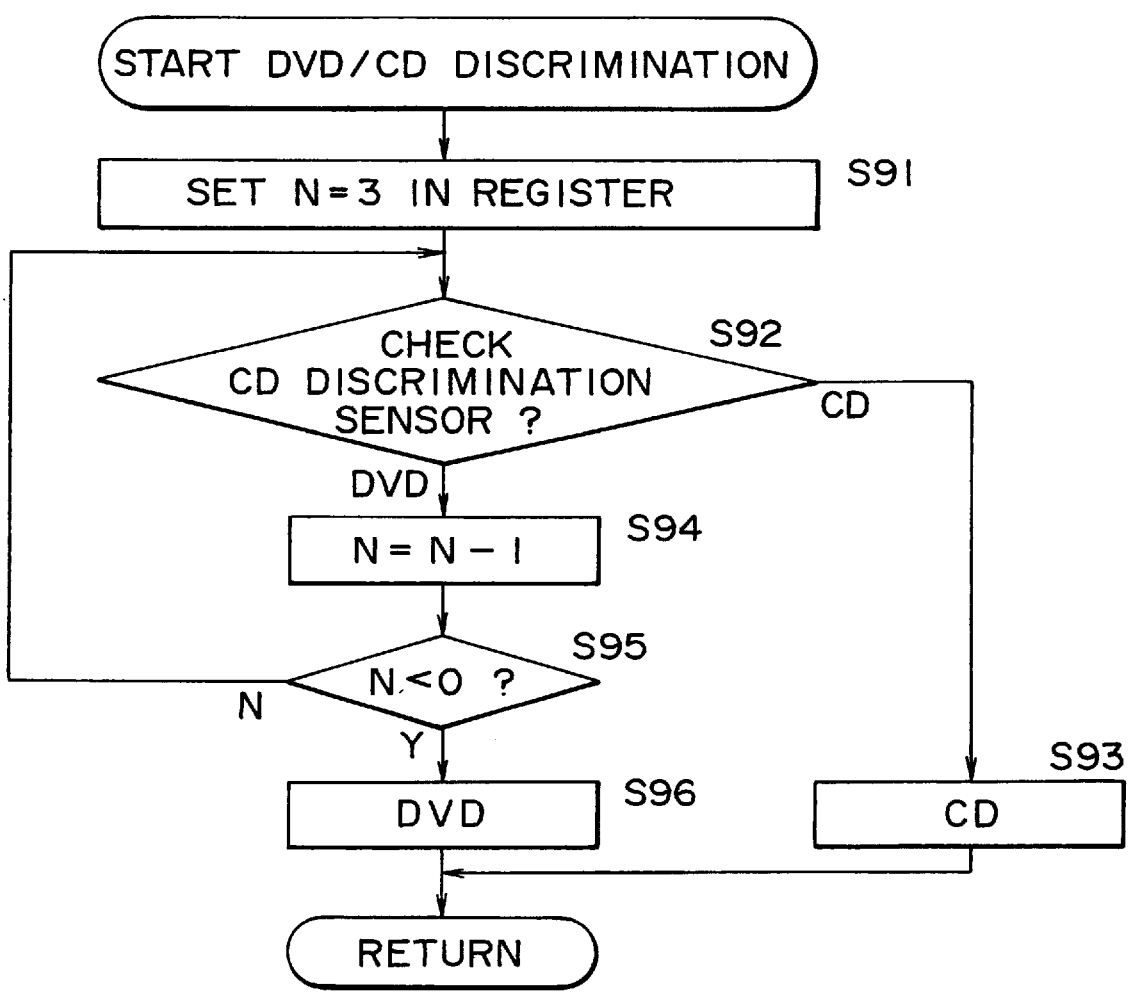
FIG. 6 is a flowchart showing details of a DVD/CD discrimination process executed at step S7 in FIG. 2.

The detail of this DVD/CD discrimination is shown in a flowchart of FIG. 6.

In this process, first a numerical value 3 is initially set, at step S91, in a register N where the number of times of checks is stored. Then at step S92, a check of the CD discrimination sensor 4 is executed. When the CD discrimination sensor 4 outputs a detection signal indicative of a CD, the operation proceeds to step S93 where the CPU 15 decides that the loaded disc is a CD.

Meanwhile, if the result of the check at step S92 signifies that the CD discrimination sensor 4 has not detected any CD, it follows that the loaded disc is a DVD. In this case, the operation proceeds to step S94, where the numerical value of the register N is incremented by 1. Thereafter at step S95, a decision is made as to whether the value of the register N is smaller than 0 or not. Since N is 2 in this case, it is not smaller than 0. Then the operation returns to step S92 to execute a check of the CD discrimination sensor 4 again. A certain time elapses from the preceding check of the CD discrimination sensor 4 (when N=3) to the current check thereof (when N=2). As the disc 1 is rotated during such a time period, the sensor 4 performs its detections by irradiating light to different positions of the disc 1 and receiving the reflected light therefrom. Accordingly, even if the loaded disc fails to be detected as a CD in the first detection due to some dust or soil existing thereon, the disc can be properly detected as a CD if a different position without any dust or soil is irradiated with the light in the second detection.

Thus, when the CD discrimination sensor 4 outputs none of CD detection signal, the result of such detection of the sensor 4 is checked three times in total. And if it is decided that none of CD detection signal is outputted from the CD discrimination sensor 4 even with a total of three checks, the numerical value of the register N is decided to be smaller than 0 at step S95. In this case, the operation proceeds to step S96 to decide that the loaded disc is a DVD.

In such discrimination between a DVD and a CD with respect to the loaded disc, the CPU 15 makes a decision at step S8 in FIG. 2 as to whether the loaded disc is a DVD or not. And if the result of this decision signifies that the loaded disc is a DVD, the operation proceeds to step S9 to execute a process of DL/SL discrimination. Meanwhile, when the loaded disc is not a DVD (i.e., the disc is a CD), the process at step S9 is skipped.

Figure 7:
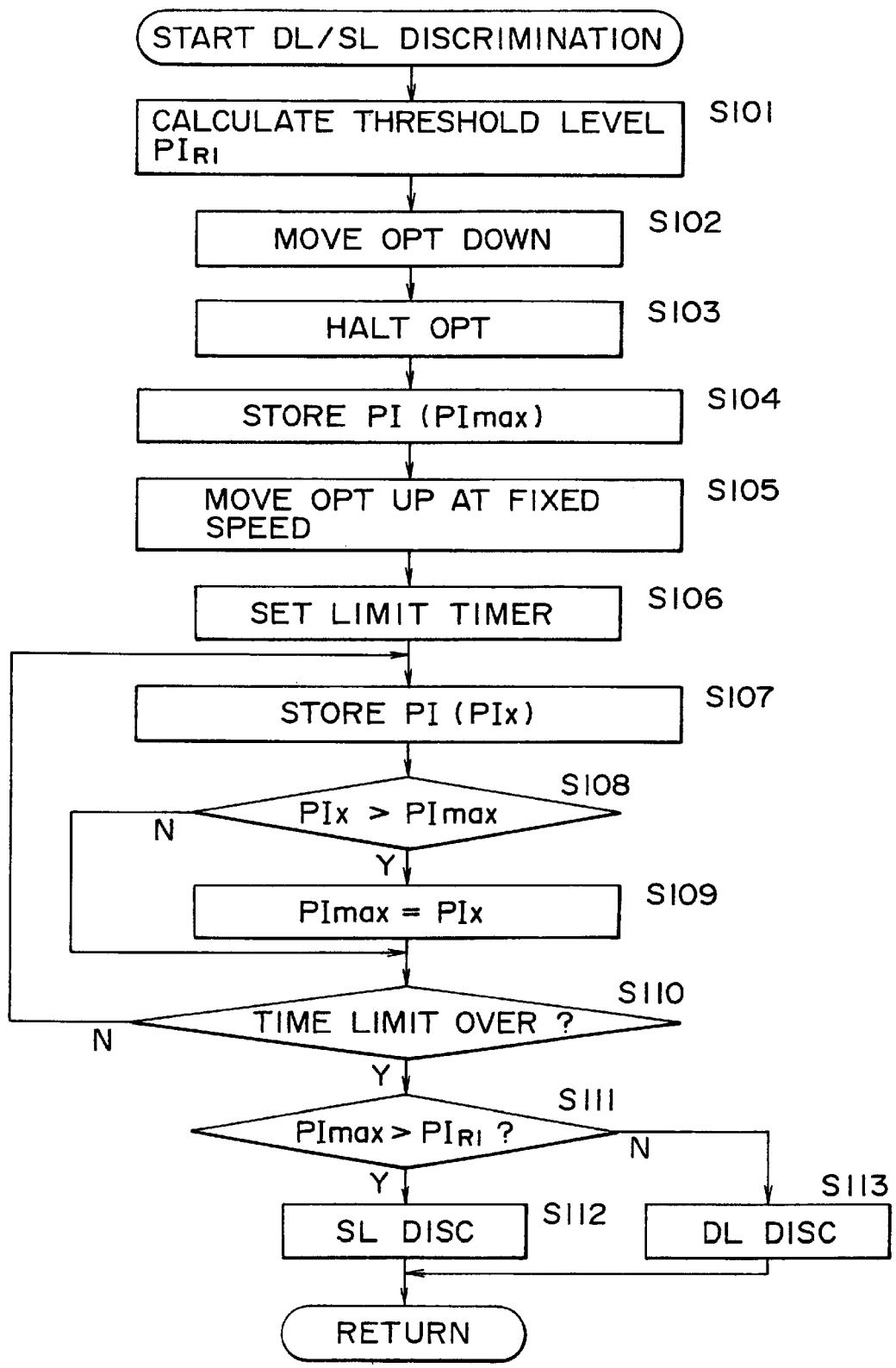
FIG. 7 is a flowchart showing details of a DL/SL discrimination process executed at step S9 in FIG. 2.

The detail of this DL/SL discrimination is shown in a flowchart of FIG. 7.

At step S101, the CPU 15 calculates a threshold level $PI_{R1}$ according to the following equation.

$$PI_{R1} = (PI(dldisc,\ slmode) + PI(sldisc,\ slmode))/2 \quad (1)$$
$$= ((PI(dldisc,\ dlmode) - PIref) \times (a/b) \times (c/d) +$$
$$(PI(sldisc,\ slmode) - PIref)) \times (e/f) \times (1/2) + PIref$$

Figure 8:
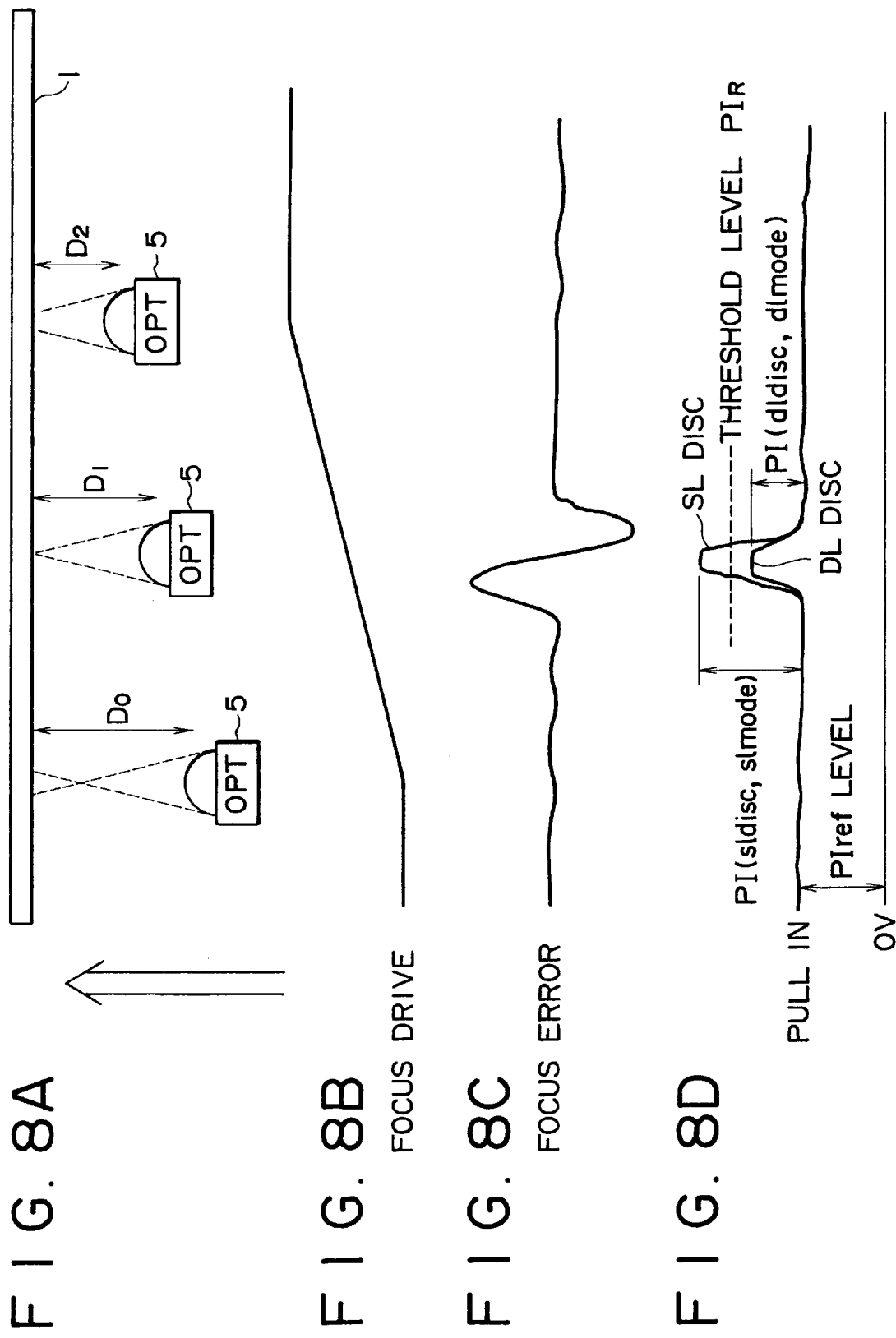
FIGS. 8A to 8D are diagrams for explaining the DL/SL discrimination process.

Now the meaning of Eq. (1) will be explained below. Regarding an SL disc and a DL disc, the reflectivity of the former is higher and that of the latter is lower. Denoted by $PI_{R1}$ is a threshold level to discriminate between an SL disc and a DL disc on the basis of such reflectivity difference. A focus error signal of FIG. 8C is obtained when the pickup (OPT) 5 is moved from a distant position toward the disc 1 as shown in FIG. 8A by the focus drive voltage of FIG. 8B. And a pull-in signal becomes maximum in the vicinity of a zero crossing of the focus error signal, as shown in FIG. 8D. Since the reflectivity of an SL disc is higher than that of a DL disc, the level of the pull-signal in the vicinity of a zero crossing of the focus error signal is higher in an SL disc than in a DL disc. Therefore, the threshold level $PI_{R1}$ may be set to an intermediate value between the pull-in signal of an SL disc and that of a DL disc.

As described, there are stored, in the EEPROM 19, PI(sldisc, slmode) representing the pull-in signal level (except PIref level of DC component) for reproduction of a DL disc in a DL mode, and also PI(dldisc, dlmode) representing the pull-in signal level (except PIref level) for reproduction of an SL disc in an SL mode. Fundamentally, the threshold level $PI_{R1}$ may be set to an intermediate value between such two levels.

However, these values are varied in proportion to the set laser power or gain, and are also varied depending on whether the focus servo is on or off. Suppose now that, as given below, a:b denotes the ratio between parameters LPSL and LPDL in the SL mode and the DL mode relative to the laser power.

$$LP_{SL}:LP_{DL}=a:b$$

Similarly, as given below, c:d denotes the ratio between parameters GSL and GDL in the SL mode and the DL mode relative to the gain.

$$G_{SL}:G_{DL}=c:d$$

Further, as given below, e:f denotes the ratio between a pull-in signal level PIfocusoff obtained when the focus servo is off and another pull-in signal level PIfocuson obtained when the focus servo is on.

$$PIfocusoff:PIfocuson=e:f$$

Consequently, the maximum level PI(dldisc, slmode) of the pull-in signal obtained in reproducing a DL disc in the SL mode is expressed as $$PI(dldisc,\ slmode)=(PI(dldisc,\ dlmode)-PIref) \times (a/b) \times (c/d) \times (e/f) + PIref$$

(2)

Similarly, the maximum level PI(sldisc, slmode) of the pull-in signal obtained in reproducing an SL disc is expressed as $$PI(sldisc,\ slmode)=(PI(sldisc,\ slmode)-PIref) \times (e/f)+PIref \quad (3)$$

Therefore, Eq. (1) can be derived from Eqs. (2) and (3) mentioned above.

Upon calculation of the threshold level $PI_{R1}$ as described, the operation of the CPU 15 proceeds to step S102 in FIG. 7 where the pickup 5 is moved away from the disc 1. And subsequently at step S103, the pickup 5 is brought to a stop. In this manner, as shown in FIG. 8A for example, the pickup 5 is brought to a stop at the position spaced apart by a distance $D_0$ from the disc 1.

The pickup 5 irradiates a reproducing laser beam to the disc 1 and then receives the reflected beam therefrom. In response to the reflected beam thus received, the pickup 5 outputs to the preamplifier 6 a signal corresponding to the amount of the received beam. Subsequently the preamplifier 6 supplies signals, which correspond to the photo diodes A–F, to the matrix circuit 16. Then the matrix circuit 16 adds the outputs of the photo diodes A–D and supplies the result to the peak hold circuit 17. This circuit 17 holds the peak value of the input pull-in signal and supplies the result to the CPU 15. Thus the CPU 15 holds, at step S104, the PI signal level as PImax in a state where the pickup 5 is placed at the position farthest from the disc 1.

Thereafter the operation proceeds to step S105, where the CPU 15 controls the internal servo processor 18 and enables the pickup driver 20 to supply a focus drive signal of FIG. 8B to the pickup 5, so that the pickup 5 is moved vertically to be gradually closer toward the disc 1, as shown in FIG. 8A.

Subsequently the CPU 15 sets the internal limit timer at step S106, and then holds, at step S107, the extracted output of the peak hold circuit 17 in the register PIx. Next the operation proceeds to step S108, where the peak value PIx held at step S107 is compared with the peak value PImax held at step S104. And when the result of this comparison signifies that PIx is greater than PImax, the operation proceeds to step S109 where the value held as PIx is then stored as PImax. Meanwhile, if the result at step S108 signifies that PIx is equal to or smaller than PImax, the process of step S109 is skipped.

Next the operation proceeds to step S110, where a decision is made as to whether the time limit set at step S106 is over or not. And if the result of this decision signifies that the time limit is not over yet, the operation returns to step S107 and then the process thereafter is executed repeatedly. Thus, the maximum level of the PI signal obtained in gradual approach of the pickup 5 to the disc 1 is set as PImax.

Meanwhile, if the result of the decision at step S110 signifies that the time limit is over, the operation proceeds to step S111 where another decision is made as to whether PImax is greater or not than the threshold level $PI_{R1}$ calculated at step S101. As shown in FIG. 8D, the level of the PI signal becomes maximum at a zero crossing of the focus error signal shown in FIG. 8C (i.e., at the timing when the pickup 5 is placed at a position spaced apart by a distance $D_1$ as shown in FIG. 8A). And this maximum value is stored as PImax.

In the case of an SL disc, the value of PImax is greater than the threshold level $PI_{R1}$, as shown in FIG. 8D. Then the operation proceeds to step S112 where the CPU 15 decides that the loaded one is an SL disc. Meanwhile in the case of a DL disc, the value of PImax is smaller than the threshold level $PI_{R1}$, as shown in FIG. 8D. In this case, the operation proceeds to S113 where the CPU 15 decides that the loaded one is a DL disc.

After such a discrimination between a CD and a DL DVD or an SL DVD with respect to the disc being currently loaded, the CPU 15 resets, at step S10 in FIG. 2, the power of the laser diode and some parameters including the gain of the reproducing system, in accordance with the type of the disc thus discriminated. Then the operation proceeds to step S11 where the CPU 15 controls the servo processor 18 to turn on a focus servo. Subsequently the CPU 15 waits at step S12 until the focus servo is locked, and the operation proceeds to step S13 where the CPU 15 controls the CLV controller 11 to halt the constant-torque rotation of the spindle motor 2 started at step S4 and then turns on a rough servo. Next at step S14, the CPU 15 controls the servo processor 18 to turn on a tracking servo. Thereafter at step S15, the CPU 15 controls the CLV controller 11 to turn on a CLV servo.

The CPU 15 waits at step S16 until the CLV servo is locked, and thereafter the operation proceeds to step S17 where the CPU 15 controls the servo processor 18 to turn on a sled servo. Next at step S18, a decision is made as to whether the loaded disc is a DVD or not (this discrimination is performed at step S7), and if the result signifies a CD, the operation proceeds to step S26 to execute a process of reproduction.

Figure 9:
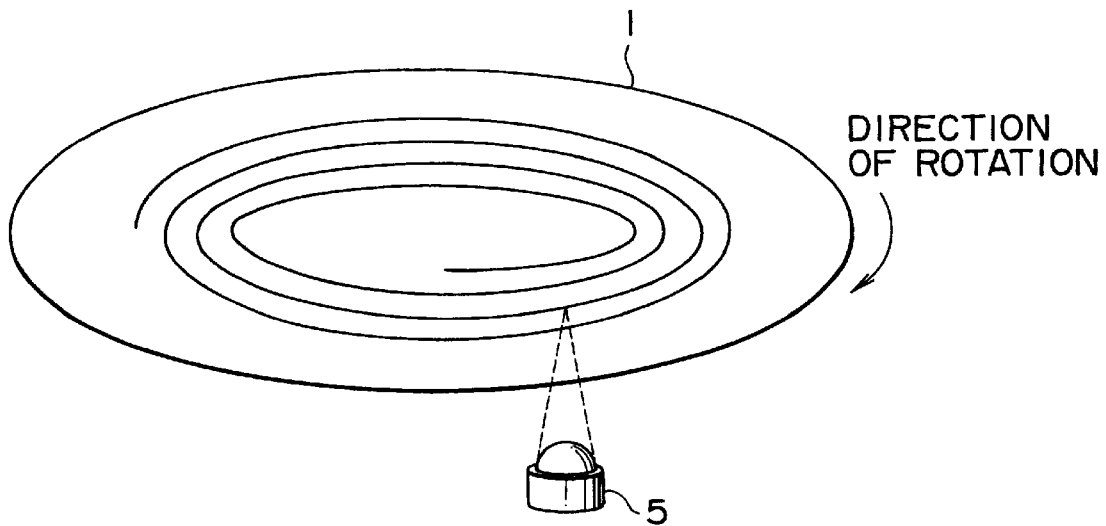
FIG. 9 is a diagram for explaining reproduction performed when a disc is loaded in a normal state.
Figure 10:
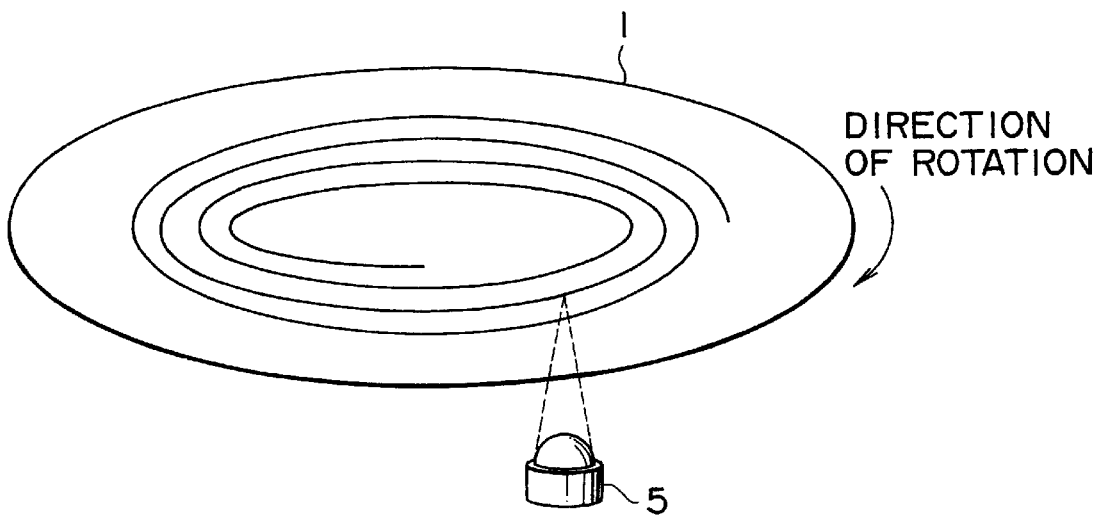
FIG. 10 is a diagram for explaining reproduction performed when the disc is loaded in a face-down state.
Figure 11:
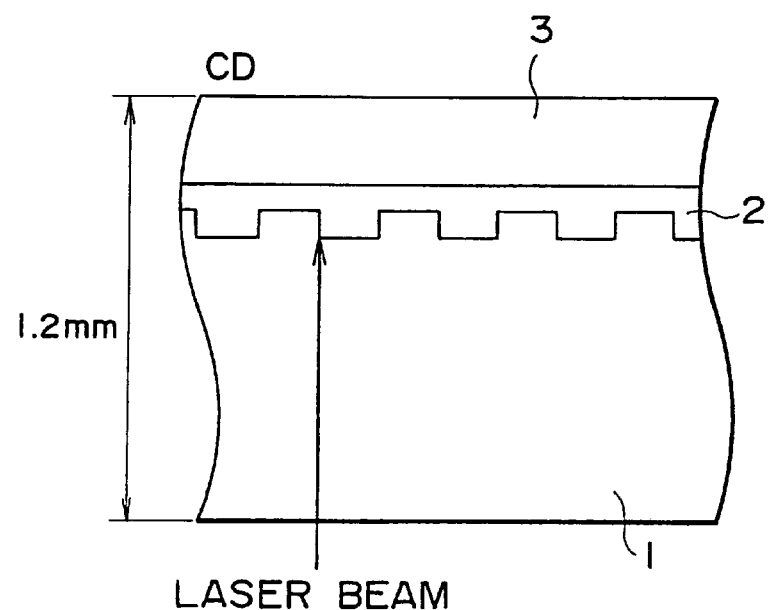
FIG. 11 is a sectional view showing the structure of a CD.
Figure 12:
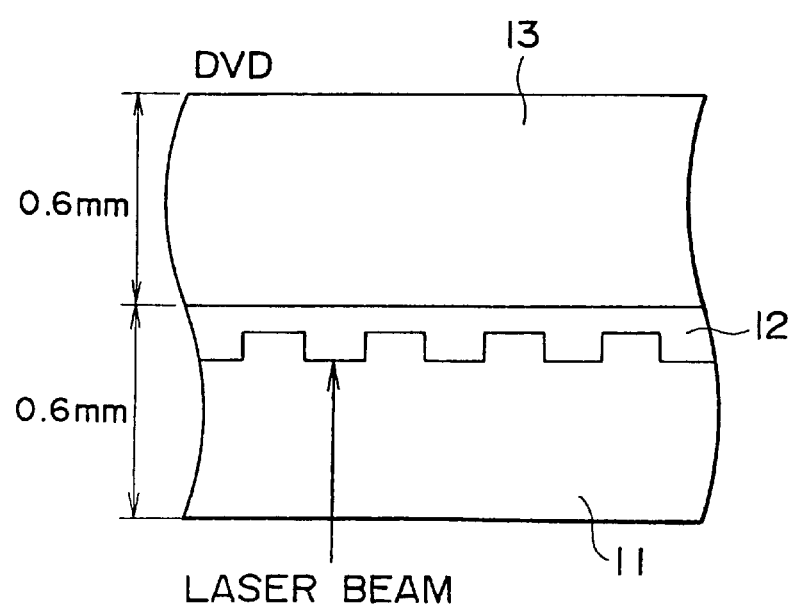
FIG. 12 is a sectional view showing the structure of a DVD.
Figure 13:
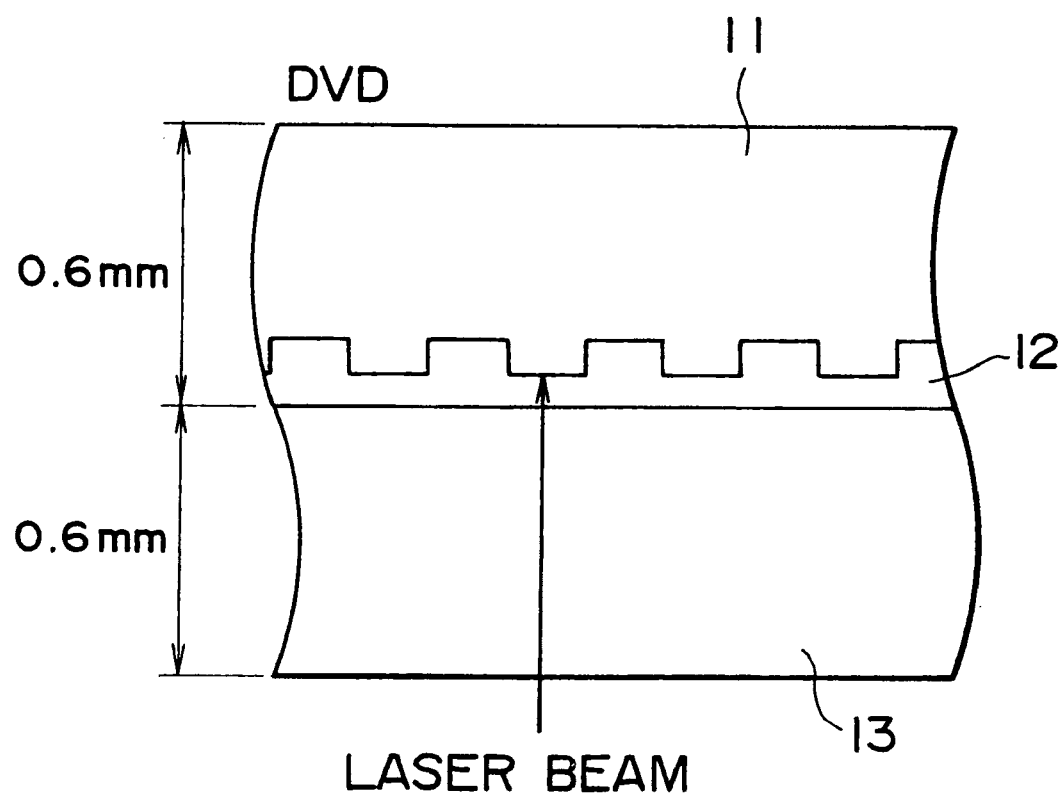
FIG. 13 shows a sectional structure when a DVD is loaded in a face-down state.

In case the result of the decision at step S18 signifies that the loaded disc is a DVD, the operation proceeds to step S19 where the CPU 15 sets the internal limit timer, and then an address reading process is executed at step S20. More specifically, the signal outputted from the preamplifier 6 is equalized by the equalizer 7 and then is inputted to the PLL 8. Subsequently the PLL 8 produces a clock signal out of the input signal and supplies both the clock signal and the input signal from the equalizer 7 to the EFM decoder 9. Next the EFM decoder 9 executes EFM demodulation in synchronism with the input clock signal and supplies the demodulated signal to the sync separator 10 and the ECC circuit 13. The sync separator 10 separates a sync signal from the input signal and then supplies the sync signal to both the CLV controller 11 and the address decoder 12. Meanwhile the ECC circuit 13 corrects any error of the data inputted from the EFM decoder 9 and supplies the corrected data to the address decoder 12. Subsequently the address decoder 12 decodes the input data from the ECC circuit 13 in synchronism with the sync signal obtained from the sync separator 10 and then outputs the decoded data to the CPU 15. Thus, the CPU 15 reads out the address from the disc 1. When the disc 1 loaded properly on the spindle motor 2 is rotated clockwise as shown in FIG. 9, the point of data reproduction by the pickup 5 is gradually shifted toward the outermost of the disc 1. In contrast therewith, when the disc 1 loaded in a face-down state on the spindle motor 2 (with the protective film 13 thereof opposed to the pickup 5) is rotated clockwise as shown in FIG. 10, the point of data reproduction by the pickup 5 is gradually shifted toward the innermost of the disc 1.

In a normal state of FIG. 9 where proper data reproduction is performed, addresses recorded in sectors. on tracks of the disc 1 increase in accordance with the shift of the reproduction point toward the outermost of the disc 1. However, in a face-down state of the disc 1 shown in FIG. 10, it is impossible to properly read the data therefrom. In other words, the read data are meaningless. And even though the addresses can be read out, the continuity thereof is not ensured. (The addresses gradually increase in the case of FIG. 9, while the addresses gradually decease in the case of FIG. 10.) Therefore, at step S21, the CPU 15 makes a decision as to whether the data are properly read or the addresses are continuous. And if the result of this decision signifies that the data are read properly and the addresses are continuous, the operation proceeds to step S26 to perform reproduction of the data. Meanwhile, in case the result of the above decision signifies that the data are not read properly and the addresses are not continuous either, the operation proceeds to step S22 where another decision is made as to whether the time limit set at step S19 is over or not. And if the time limit is not over, the operation returns to step S20 and then the process of reading the address is executed again.

Thus, when proper reading of the data and continuous reproduction of the addresses fail to be confirmed within the preset time limit, the operation proceeds to step S23 where the CPU 15 decides that the disc 1 is in its face-down state. And subsequently the operation proceeds to step S24 where the CPU 15 enables the LCD 21 to display a warning message which indicates that the disc 1 is in the face-down state. The circuit may be so modified that the CPU 15 switches on an LED to indicate the face-down state of the disc 1.

Thereafter the operation proceeds to step S25, where the CPU 15 controls the loading mechanism 22 to eject the disc 1.

In this manner, the user is informed that the disc 1 is placed in its face-down state, hence avoiding a misconception that the disc 1 is damaged.

And it becomes possible to instruct the user to reload the disc 1 properly.

Thus, according to the disc reproducing apparatus and method of the present invention, a decision is made as to whether the data reproduced from the disc are proper or not, and the driving of the disc is controlled in response to the result of such decision, thereby preventing erroneous data reproduction in a face-down state of the disc.

Although the above description has been given in relation to an exemplary case of reproducing a DVD, it is to be understood that the present invention is not limited to such example alone, and the invention is applicable also to a different case of recording a DVD or recording and/or reproducing some other disc as well.

What is claimed is:

1. A disc reproducing apparatus comprising:
   a reproducing means for reproducing the data recorded in a disc;
   a decision means for making a decision as to whether the data reproduced by said reproducing means are proper or not;
   a detection means for detecting a face-down state of said disc in response to the result of the decision executed by said decision means; and
   a control means for controlling the driving of said disc in response to the result of the detection executed by said detection means.

2. The disc reproducing apparatus according to claim 1, wherein said decision means makes a decision as to whether the reproduced data are proper or not in accordance with the regularity of the reproduced data.

3. The disc reproducing apparatus according to claim 2, wherein said decision means makes a decision as to whether the reproduced data are proper or not in accordance with the continuity of addresses of the reproduced data.

4. The disc reproducing apparatus according to claim 1, further comprising a warning means for generating a predetermined warning signal in response to the result of the decision executed by said decision means.

5. The disc reproducing apparatus according to claim 1, further comprising a control means which ejects the disc in response to the result of the decision executed by said decision means.

6. The disc reproducing apparatus according to claim 1, wherein the distance from each of the two surfaces of said disc to an information recording layer thereof is so determined that the information in the information recording layer can be read by said apparatus.

7. The disc reproducing apparatus according to claim 6, wherein said disc conforms with the standard of a single-layer DVD having one information recording layer.

8. A disc reproducing method comprising the steps of:

reproducing the data recorded in a disc;

making a decision as to whether the reproduced data are proper or not;

detecting a face-down state of said disc in response to the result of the decision; and controlling the driving of said disc in response to the result of the detection.

9. The disc reproducing method according to claim 8, wherein said step of making a decision includes a step of deciding the regularity of the reproduced data.

10. The disc reproducing method according to claim 8, wherein said step of making a decision includes a step of deciding the continuity of addresses of the reproduced data.

11. The disc reproducing method according to claim 8, further comprising a step of generating a predetermined warning signal in response to the result of said decision.

12. The disc reproducing method according to claim 8, further comprising a step of ejecting the dis c in response to the result of said decision.

* * * * *